UNITED STATES PATENT OFFICE.

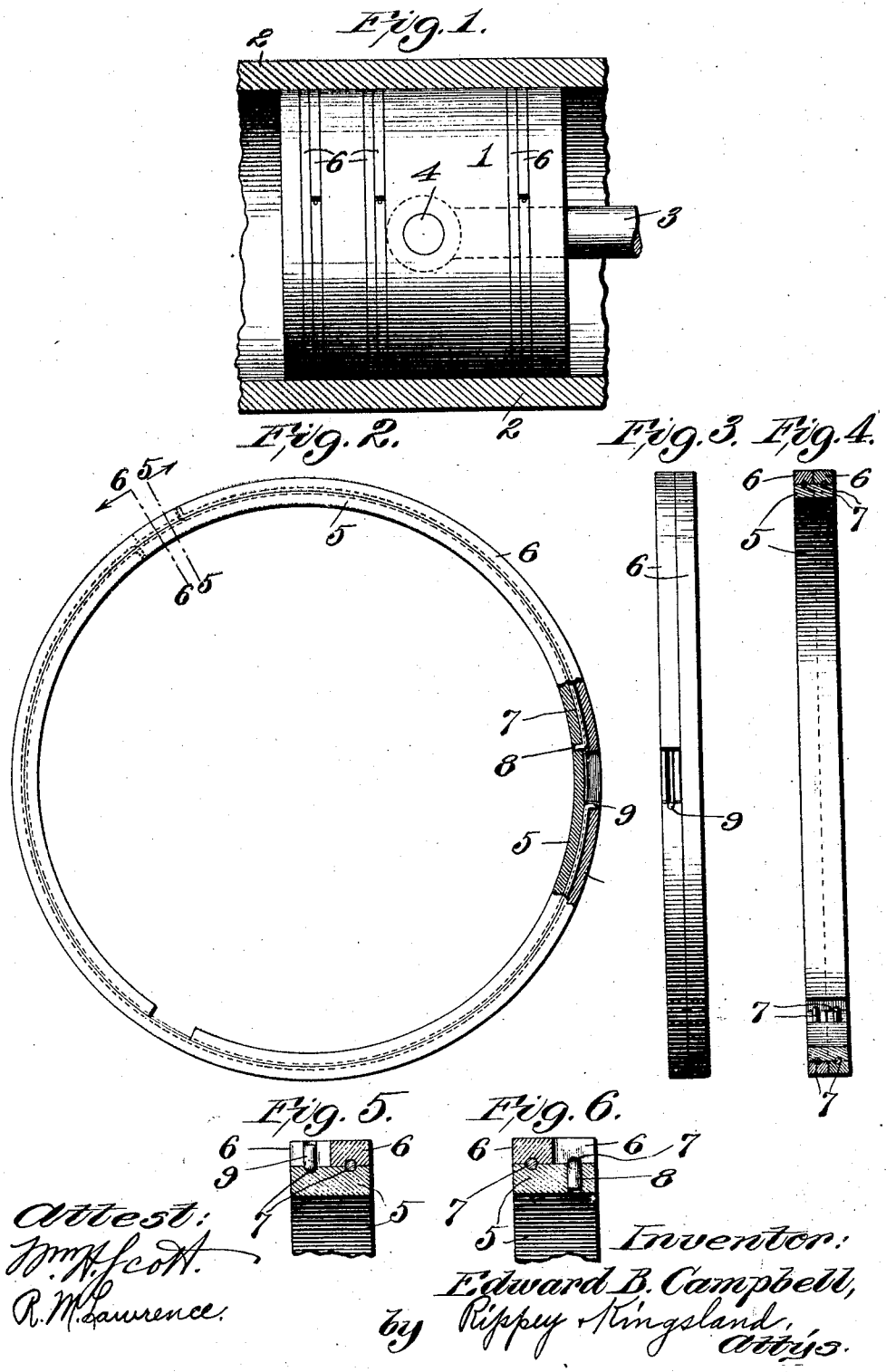

EDWARD B. CAMPBELL, OF ST. LOUIS, MISSOURI, ASSIGNOR TO STA-TITE PACKING RING COMPANY, OF ST. LOUIS, MISSOURI, A CORPORATION OF MISSOURI.

PACKING-RING.

1,087,213.

Specification of Letters Patent.

Patented Feb. 17, 1914.

Application filed July 28, 1913. Serial No. 781,478.

*To all whom it may concern:*

Be it known that I, EDWARD B. CAMPBELL, a citizen of the United States, residing at the city of St. Louis and State of Missouri, have invented a new and useful Packing-Ring, of which the following is a specification.

This invention relates to packing rings of the type used in connection with pistons and it consists of the novel construction, combination and arrangement of parts, having the novel relative action and adjustment, hereinafter shown, described and set forth in the appended claims.

An object of the invention is to provide an improved packing consisting essentially of a number of metallic rings having a relative resilient action, so that when assembled in position upon the piston they will impart a uniform pressure against the inner surface of the cylinder throughout their circumference, even if the cylinder becomes worn and is not a true and exact circle.

Another object is to provide an improved packing consisting of a number of resilient outer rings of the open type cut from a cylinder having the same diameter as the interior of the cylinder in which the rings are to operate, in combination with an inner ring of the resilient open type cut from a cylinder of the same diameter as the cylinder from which the outer rings are cut, and compressed so that the outer rings will encircle the inner ring and be expanded in a form to fit the cylinder wall, and resilient members interposed between the outer and inner rings also acting to expand the outer rings to fit the cylinder wall, so that the rings throughout their circumference will be pressed equally and uniformly against all parts of the interior of the cylinder wherein they operate even if the walls are not a true circle.

Other objects to be attained by this invention, and many advantages of the invention, will be apparent to those skilled in the art without specific mention thereof, and it will be understood that I do not restrict my invention nor the scope of the appended claims by the omission of a statement of any of the objects and advantages of the invention.

In the accompanying drawings I have illustrated a preferred embodiment of the invention, in which—

Figure 1 is a longitudinal sectional view of a portion of a piston cylinder, illustrating a piston mounted therein equipped with packing rings constructed in accordance with my invention. Fig. 2 is an enlarged view of the packing ring removed from the piston, showing the uniform expansion of the several rings due to their resiliency. Fig. 3 is an elevation of the ring showing the separation of the ends of one of the outer rings due to the resiliency of said outer ring and of the inner ring and the uniting key. Fig. 4 is a cross sectional view of the assembled packing ring. Fig. 5 is a sectional view taken approximately on the line 5—5 of Fig. 2, looking in the direction indicated by the arrow on the section line, and illustrating a connection which may be employed for connecting the ends of the outer rings with one end of their respective keys. Fig. 6 is a sectional view taken approximately on the line 6—6 of Fig. 2 looking in the direction of the arrow on the section line, and illustrating a connection which may be employed for uniting the ends of the keys with the inner ring.

As illustrated in the drawings the piston 1 is of the reciprocating type, and is mounted within a cylinder 2 of usual construction. Power is transmitted from the piston 1 through the medium of a piston rod 3 which is connected to the piston by the common pivot connection 4. A number of annular channels or grooves are formed in the periphery of the piston 1, and within these annular channels or grooves the packing rings are mounted.

The construction and relative arrangement of the packing are illustrated in Figs. 2 to 6, inclusive, in which it will be seen that each packing consists of a resilient inner ring 5 originally cut from a cylinder having the same diameter as the interior of the cylinder, and having a portion removed so that said ring may be compressed to fit within one of the channels or grooves around the piston. Each ring 5 is encircled by two resilient outer rings 6 which are cut from a cylinder of the same diameter as the interior of the piston and which, when in assembled relation upon the ring 5, occupy the positions shown in Fig. 2. The width of each outer ring 6 equals one half of the width of the inner ring 5, so that when the rings are assembled they fit closely within the channels or grooves around the piston. The several rings are of the open type, and when they are assembled it is preferable that the open end of each ring be separated from the open ends of the other rings, so that the ends of each ring are separated from the ends of every other ring included in the packing a distance equal to about one third of the periphery of the rings. Since the ring 5 before being compressed has the same diameter as the interior of the cylinder and has a tendency to expand to its original size it is obvious that by this arrangement substantially equal outward pressure will be exerted throughout the circumference of the rings 6.

The periphery of the ring 5 is provided with two encircling grooves, and the inner face of each of the rings 6 is provided with a single groove arranged to register with or match one of the grooves in the ring 5. These matching grooves constitute key seats adapted to receive the keys 7 which are of resilient metal, and which also impart an outward pressure against the outer rings 6 throughout their circumference, thereby coöperating with the ring 5 in this action. The keys 7 may be connected with the rings 5 by having angular extensions 8 projecting into holes formed in said rings 5, as illustrated in Figs. 2 and 6. The opposite end of each key 7 may be provided with an extension 9 engaging the end of the corresponding ring 6 effectively to prevent turning of the rings 6 upon the ring 5.

All of the rings may be formed by cutting sections from the same cylinder, and of the same diameter as the interior of the cylinder 1; and forming the necessary key seats in the inner surfaces of the rings 6 and in the outer surface of the ring 5. After being cut from the cylinder the ring sections are cut to form rings of the open type, and may then be assembled within the channels or grooves in the piston in an obvious manner. When assembled on the piston the rings 6 are given a tendency by the ring 5 and the keys 7 to expand to a greater diameter than the interior of the cylinder, and since all of the rings and the keys are of resilient material the rings 6 are caused to impart a uniform pressure against the cylinder throughout their periphery.

I am aware that there may be variations in the construction and arrangement of the different parts, and that the rings may be made of various diameters and dimensions. I contemplate such variations as may be found necessary under different service conditions, and I do not restrict myself to the specific features of arrangement and construction shown except where specifically set forth in the appended claims.

What I claim and desire to secure by Letters Patent is:

1. The combination with a cylinder, and a piston arranged to reciprocate in said cylinder, of two rings of the open type mounted on said piston, an expansion ring imparting outward pressure against both of said rings, an expanding locking key ring acting against each of said first-named rings effectively to expand said rings independently of each other and in conformity with any worn portions of the cylinder, whereby a tight and close joint will be made by one or another of said rings where parts of the cylinder are worn from a perfect circle.

2. The combination with a cylinder, and a piston arranged to reciprocate in said cylinder, of a packing revolubly mounted on the piston and composed of two rings whose exterior circumference when in perfect circular form is the same as the interior circumference of the cylinder, a third ring whose exterior circumference when in perfect circular form is the same as the circumference of said two rings and as the interior circumference of the cylinder encircled and compressed by said two rings, and resilient devices uniting said two rings with said third ring and locking said two rings and said third ring together, substantially as specified.

3. The combination with a piston having a circumferential groove, an inner ring of the resilient open type revolubly seated in said groove, and two outer rings of the resilient open type encircling said inner ring, in said groove, of annular keys separate from said outer and inner rings encircling said inner ring, and means whereby said keys will prevent relative rotation of said rings while permitting joint rotation and free expansion thereof, substantially as specified.

4. A packing comprising a resilient inner ring, two resilient outer rings encircling and expanded by the pressure of said inner ring, and a separate resilient key element between said inner ring and each of said outer rings from relative relation with respect to said inner ring and arranged to impart expanding pressure against said outer rings.

5. A packing for pistons comprising a resilient open inner ring having a plurality of grooves in its outer surface, a number of resilient open outer rings encircling and expanded by the pressure of said inner ring and having grooves in their inner surface matching the grooves on said inner ring, and resilient keys mounted between said rings and fitting in said matching grooves and imparting expanding pressure against said outer rings, substantially as specified.

6. A packing for pistons comprising a resilient inner ring, key seats formed in the periphery of said inner ring, resilient outer rings encircling and expanded by the pressure of said inner ring, a key seat formed in each of said outer rings matching said key seats in said inner ring respectively, and keys seated in said key seats between said rings and preventing relative rotation of said rings, substantially as specified.

7. The combination with a cylinder, and a piston operating in said cylinder and provided with a circumferential groove, of a ring seated in said groove and being compressed from an annulus having the same external diameter as the interior of said cylinder, two rings encircling said first-named ring in said groove and being of the same diameter as the original diameter of said first-named ring, whereby said first-named ring will impart uniform outward pressure throughout the circumference of said two rings, and resilient keys mounted between said two rings and said first-named ring also imparting uniform outward pressure throughout the circumference of said last-named rings.

8. A packing for pistons comprising a compressed ring of the open type automatically expansible to a ring portion having the same external diameter as the diameter of the interior of the cylinder in which it is to operate, in combination with a number of rings of the same diameter as is said first-named ring before it is compressed encircling said first-named ring and pressing against the interior surface of the cylinder.

9. The combination with a cylinder, and a piston arranged to reciprocate in said cylinder and provided with a circumferential groove, of a resilient ring having the same external diameter as the interior diameter of the cylinder and having an open space at one side thereof, said ring being compressed and seated within said groove, a number of circumferential key seats formed in said ring, two outer rings encircling and compressing said first-named ring and being actuated radially by said first-named ring, a key seat formed in the inner surface of each of said outer rings, and expanding key rings mounted in said key seats and preventing relative movement of said outer rings and said inner ring, substantially as specified.

In witness whereof, I have signed this specification in the presence of two subscribing witnesses.

EDWARD B. CAMPBELL.

Witnesses:
R. M. LAWRENCE,
J. D. RIPPEY.

---

Copies of this patent may be obtained for five cents each, by addressing the "Commissioner of Patents, Washington, D. C."